Patented Dec. 29, 1942

2,306,920

UNITED STATES PATENT OFFICE 2,306,920

TERTIARY AMINE REACTION PRODUCT

John M. Weiss and Robert P. Weiss, New York, N. Y., assignors to Research Corporation, a corporation of New York No Drawing. Application February 15, 1940, Serial No. 319,030

10 Claims. (Cl. 260—78)

This invention relates to the production of resinous reaction products of maleic anhydride compounds with amine compounds and it includes these reaction products themselves as new compounds and compositions of matter.

The invention arose through the discovery that maleic anhydride and certain derivatives thereof, such as chlormaleic anhydride, will react with various amines to form products, many of which are of a resinous character and adapted to be employed as molding and casting resins, in the manufacture of resinous base varnishes, paints and lacquers, in rubber compounding, and in other uses where various types of resins and plastics are customarily employed.

In its broader aspects, the present invention is concerned with a process in which aliphatic dibasic acid anhydrides (or the acids themselves) wherein the carboxyl groups are attached to adjacent carbon atoms joined by a double bond, are reacted with amines to form products which either themselves are resinous in nature or from which resinous bodies can be obtained. The term "amine" as used throughout this specification and the appended claims refers only to those nitrogen-containing compounds in which the nitrogen atom is trivalent, and is connected to one, two or three carbon atoms, and to two or one hydrogen atoms when it is attached to only one or two carbon atoms. Such substances as those of the hydrazine class, wherein nitrogen-to-nitrogen linkages occur, are not amines and are not within the class of substances with which this invention is concerned.

Other substances capable of entering into this characteristic reaction to produce commercially valuable products will hereinafter be disclosed. The present reaction is not to be confused with those which may involve reaction of other substituent groups contained in the amine compound used.

The broad object of the invention is to provide a new group of resins and resin-like bodies having a wide variety of physical and chemical properties. A specific object is to produce for commercial purposes a series of water-insoluble resins and another series of valuable water-soluble resins.

In the well known Diels and Alder reaction (see, for example, United States Patent No. 1,944,731) maleic anhydride is reacted with organic compounds having a characteristic system of conjugated double bonds. It is well known that conjugated double bonds, i. e., the grouping —C=C—C=C—, are quite reactive, both in aliphatic compounds and in hydroaromatic compounds. However, compounds which contain such groupings as

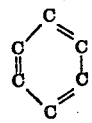

in which there is a ring with three double bonds alternate with three single bonds, as in aromatic and certain heterocyclic compounds, the reactions characteristic of conjugated double bonds that occur in the patented process do not take place, and hence this grouping is not considered reactive in the sense employed in the patent and in the present specification. We have discovered that maleic anhydride, or its equivalent, will react with other organic compounds which may not contain conjugated double bonds, such compounds being those containing an amine group. The present reaction therefore is independent of any double bonds in the reacting amine. It is also known that maleic acid and its anhydride, in common with other dibasic or polybasic acids and anhydrides, such as succinic and phthalic acids and anhydrides, may be reacted with triethanolamine and other amines having a plurality of alkylol groups to form resins. In these cases, however, the reaction takes place between the acids and the multiple hydroxyl groups of the amine to form alkyd-type resins, and these products are not related to the products with which this invention deals, nor is their formation within the purview of the present invention.

In the practice of the invention a reaction occurs and resins may be formed starting with the maleic anhydride compound and primary, secondary or tertiary amines. It appears that the nature of the reaction by which resinous products are produced varies somewhat as between the amines of these three general classes. Thus, in the case of primary amines, it is probable that reaction with maleic anhydride produces a maleamic acid which may be further converted into a maleimide, and the resinous products appear to be formed from primary amines by the condensation or polymerization of the maleamic acid or the maleimide. In the case of secondary amines, maleamic acid derivatives are formed, and it appears that the resinous products are obtained by condensation or polymerization of the resulting maleamic acid. In the case of tertiary amines a somewhat different action seems to be involved in which these amines induce the resinification of the maleic anhydride compound, and this occurs even when catalytic quantities of the tertiary amine are used, as well as when larger amounts are employed. The present application is directed specifically to those embodiments of the invention in which tertiary amines are employed. Those embodiments of the invention which are concerned with primary and secondary amines are the specific objects of copending applications Serial No. 319,028, filed February 15, 1940, and Serial No. 319,029, filed February 15, 1940, respectively.

The reactions herein described are in some cases strongly exothermic. Under such conditions the reaction can usually be controlled by cooling or by the presence of suitable diluents during the reaction. In some cases, however, it may be necessary to heat the reaction materials to high temperatures, or to heat them under pressure. In some instances products such as maleic acid, fumaric acid, malic acid, ethyl fumarate, and the like (that is, substances which appear to liberate maleic anhydride during reaction), may be used instead of maleic anhydride in the practice of the invention. When these substances are used in place of maleic anhydride or its simple derivatives, such as chlormaleic anhydride, heat is usually necessary to start the reaction.

The reaction products may be modified in various ways. For example, the reaction may be conducted in the presence of glycerine, glycol, or another polyhydric alcohol with or without a modifying acid of a type other than the maleic anhydride compound. Complex resinous masses or mixtures of resins including the products of this invention and alkyd-type materials may be thus obtained. Also, mixtures of amines may be used rather than individual amine compounds to vary the properties of the products, or to take advantage of the varying rates of reaction with maleic anhydride compounds possessed by the various amines.

While the exact nature of the reaction in some instances has not been determined, we have found that in certain cases clearly defined reactions appear to take place. In these reactions water vapor, volatile intermediate products, or carbon dioxide may be evolved. The difference in properties obtained by heating the same ingredients at different temperatures also shows that an initial reaction may take place forming products which may or may not have resinous properties, and which products thereafter condense or polymerize to form resinous masses. All intermediate resinous or resin-forming products as well as final products are part of this invention.

As has been indicated, resinous products may be formed by the action of tertiary amines generally on maleic anhydride, and the tertiary amines used may contain organic radicals which are aliphatic, aromatic or aralykyl groups, or they may contain heterocyclic groups and various combinations of these. The tertiary amine may possess one or several amino nitrogens. The action of tertiary amines with maleic anhydride proceeds with the splitting out of carbon dioxide. This occurs regardless of the relative proportions of the maleic anhydride and tertiary amine. The amount of carbon dioxide evolved is approximately one mol for each mol of maleic anhydride involved. When substantial amounts of the tertiary amine are used, the action and the resinous product appear to be no different than when very small amounts of tertiary amines are employed, and most of the amine is easily recoverable as such. However, an appreciable proportion of the tertiary amine usually is not recovered, but is retained in the product. Whether this non-recoverable amine is chemically or mechanically retained in the product can not be determined, but it seems most likely that it is merely mechanically held in such manner as precludes its removal by the usual physical means, such as heating in vacuo, extraction with solvents for the amine and the like.

Various proportions of the maleic anhydride substance and tertiary amines may be used in the practice of the invention. As in the case of primary and secondary amines, the reaction may occur in molecular proportions of the maleic anhydride compound and the tertiary amines, but it is not necessary to employ these proportions, and greater or lesser amounts may be used. In fact, the action of tertiary amines seems to be virtually unconnected with the proportion of amine or amino groups present, and resins may be formed employing the amine in any quantity from very small catalytic amounts, say, 0.5%, upward. It is therefore to be understood that the present invention is not limited to any particular reacting proportions of the ingredients.

The invention will be illustrated by the following examples which are typical of its scope but which are not intended in any way to indicate its limits.

*Example I*

When tri-n-butylamine was added to a molecular equivalent quantity of maleic anhydride, very little change in temperature occurred. However, on heating these materials on the steam bath, carbon dioxide was rapidly evolved from the mixture. Analysis of the evolved gas showed it to be 99% pure $CO_2$. After gas evolution had virtually ceased, nearly all of the tributyl amine originally taken was decanted and recovered. There remained a black resinous mass which was partially soluble in hot water and readily soluble in aqueous sodium hydroxide solution. This resin also was soluble in acetone.

*Example II*

This reaction was similar to that of Example I in that the same quantity of maleic anhydride was treated with tributyl amine. In this case, however, the tributyl amine used amounted to only 0.5% by weight of the maleic anhydride. The mixture was heated at 180° to 190° C., and finally the temperature was carried up to 300° C. The gas evolved was measured in a gas meter and analyzed from time to time. Most of the gas was given off during the heating at 180° to 190° C., and it was found to be virtually pure $CO_2$ in an amount equal to 0.96 mol per mol of maleic anhydride.

A black resin was left behind, and this product was practically identical with the product of Example I.

*Example III*

A modified resin was made by mixing 70 parts by weight of hexamethylene tetramine, 232 parts by weight of maleic anhydride and 94 parts by weight of phenol. This mixture was heated at 125° C., and, when molten, a vigorous reaction occurred. The product was a light brown resin which amounted to 319 parts by weight. It was, apparently, either a simple mixture of the phenol-methylene resin and resinified maleic anhydride product, or a complex resin formed by both actions jointly.

When mixed with wood flour, this resin yielded a useful molding powder.

Many other tertiary amines and amino compounds may be used to form resins by their action on maleic anhydride-yielding compounds. Examples of these are triamyl amine, triethyl amine and many others. In every case, the resins obtained by the action of these amines on maleic anhydride have virtually the same properties. Also, the action and the resulting products appear to be the same whether small catalytic quantities or larger quantities of the tertiary amines are used.

It will be apparent that the invention is not limited to any particular procedure for introducing the ingredients into the reaction or for conducting the reaction itself. Acid imides and amino compounds containing carboxyl or sulfonic acid groups react with difficulty, if at all, with maleic anhydride, but where capable of reaction such compounds may be used in the practice of the invention.

Preferred aliphatic dibasic acid compounds for use in the practice of this invention include maleic anhydride itself, and those products above specified which appear to liberate maleic anhydride in the course of the reaction, as well as halogen derivatives of such compounds. Since this invention provides an entirely new series of resins and resinous materials, it will be obvious that these may be modified in the usual way by admixing them with other artificial resins, or natural resins and gums, and with such materials as cellulose esters, ethers or related derivatives, and that pigments, filler materials, plasticizers, waxes and the like, may be included in compositions containing the new resins which are employed to form protective coatings, sheet products or molded objects. Other modifications of the resins and resin-forming reactions disclosed will be apparent, and these variations are included within our invention as defined by the appended claims.

This application contains subject matter in common with and is, in part, a continuation of our copending applications Serial No. 737,204, filed July 27, 1934; Serial No. 132,710, filed March 24, 1937; and Serial No. 132,737, filed March 24, 1937.

We claim:

1. Process for making resinous bodies which comprises heating an anhydride of a polybasic acid compound having two carboxyl groups attached to adjacent carbon atoms joined by a double bond, with essentially only a tertiary aliphatic amine until a product suitable for use in molding and casting resins and in the manufacture of resinous base varnishes, paints and lacquers, and substantially consisting of an amorphous resinous material is formed.

2. Process for making resinous bodies which comprises heating a compound capable of yielding maleic anhydride under the conditions of the resin-forming process with essentially only a tertiary aliphatic amine until a product suitable for use in molding and casting resins and in the manufacture of resinous base varnishes, paints and lacquers, and substantially consisting of an amorphous resinous material is formed.

3. Process for making resinous bodies which comprises heating maleic anhydride with essentially only a tertiary aliphatic amine until a product suitable for use in molding and casting resins and in the manufacture of resinous base varnishes, paints and lacquers, and substantially consisting of an amorphous resinous material is formed.

4. Process for making resinous bodies which comprises heating maleic anhydride with essentially only a tertiary aliphatic polyamine until a product suitable for use in molding and casting resins and in the manufacture of resinous base varnishes, paints and lacquers, and substantially consisting of an amorphous resinous material is formed.

5. Process for making resinous bodies which comprises heating maleic anhydride with essentially only a tertiary butylamine until a product suitable for use in molding and casting resins and in the manufacture of resinous base varnishes, paints and lacquers, and substantially consisting of an amorphous resinous material is formed.

6. An artificial resinous body comprising an anhydride of a polybasic aliphatic acid compound having two carboxyl groups attached to adjacent carbon atoms joined by a double bond resinified by heating therewith essentially only a tertiary aliphatic amine until a product suitable for use in molding and casting resins and in the manufacture of resinous base varnishes, paints and lacquers, and substantially consisting of an amorphous resinous material is formed.

7. An artificial resinous body comprising a compound capable of yielding maleic anhydride under the conditions of the resin-forming process resinified by heating therewith essentially only a tertiary aliphatic amine until a product suitable for use in molding and casting resins and in the manufacture of resinous base varnishes, paints and lacquers, and substantially consisting of an amorphous resinous material is formed.

8. An artificial resinous body comprising maleic anhydride resinified by heating therewith essentially only a tertiary aliphatic amine until a product suitable for use in molding and casting resins and in the manufacture of resinous base varnishes, paints and lacquers, and substantially consisting of an amorphous resinous material is formed.

9. An artificial resinous body comprising maleic anhydride resinified by heating therewith essentially only a tertiary aliphatic polyamine until a product suitable for use in molding and casting resins and in the manufacture of resinous base varnishes, paints and lacquers, and substantially consisting of an amorphous resinous material is formed.

10. An artificial resinous body comprising maleic anhydride resinified by heating therewith essentially only a tertiary butylamine until a product suitable for use in molding and casting resins and in the manufacture of resinous base varnishes, paints and lacquers, and substantially consisting of an amorphous resinous material is formed.

JOHN M. WEISS.
ROBERT P. WEISS.